US008583852B1

(12) United States Patent
Mahajan et al.

(10) Patent No.: US 8,583,852 B1
(45) Date of Patent: Nov. 12, 2013

(54) ADAPTIVE TAP FOR FULL VIRTUAL MACHINE PROTECTION

(75) Inventors: Sameer S. Mahajan, Pune (IN); Pradip M. Kulkarni, Pune (IN)

(73) Assignee: Symantec Operation, Mountain View, CA (US)

( * ) Notice: Subject to any disclaimer, the term of this patent is extended or adjusted under 35 U.S.C. 154(b) by 242 days.

(21) Appl. No.: 13/224,013

(22) Filed: Sep. 1, 2011

(51) Int. Cl.
*G06F 12/00* (2006.01)

(52) U.S. Cl.
USPC .............................. 711/6; 711/161; 711/162

(58) Field of Classification Search
None
See application file for complete search history.

(56) References Cited

U.S. PATENT DOCUMENTS

| | | | |
|---|---|---|---|
| 7,937,525 B2 * | 5/2011 | Mondal et al. ................. | 711/106 |
| 8,171,201 B1 * | 5/2012 | Edwards, Sr. ..................... | 711/6 |
| 2002/0111835 A1 | 8/2002 | Hele et al. ........................... | 705/4 |
| 2009/0216970 A1 | 8/2009 | Basler et al. .................. | 711/162 |
| 2010/0070725 A1 | 3/2010 | Prahlad et al. ................ | 711/162 |
| 2010/0299368 A1 | 11/2010 | Hutchins et al. .............. | 707/803 |
| 2011/0173613 A1 * | 7/2011 | Mondal et al. ..................... | 718/1 |
| 2011/0265083 A1 * | 10/2011 | Davis ................................ | 718/1 |
| 2013/0036418 A1 * | 2/2013 | Yadappanavar et al. .......... | 718/1 |

OTHER PUBLICATIONS

Cisco Systems, Inc., "Advanced SAN Design—Virtualisation Technologies and Intelligent Applications Design" 2008; pp. 1-34.

EMC Corporation; "EMC RecoverPoint/SE for the CLARiiON CX4," Applied Technology; Sep. 2008; pp. 1-16. http://searchservervirtualization.techtarget.com/definition/hypervisor?vgnextfmt=print; "SearchServerVertualization.com;" Jun. 21, 2005; 1 page.
Wikipedia, the free encyclopedia, "Hypervisor" Sep. 2009, pp. 1-11.
Network Instruments, "Fibre Channel Network Analysis-Real Time Expert Analysis for Storage Area Networks," Network Instruments LLC, Corporate Headquarters, Minnetonka, Minnesota, 55343; 2006; pp. 1-4.
Network Instruments White Paper, "Application and Network Performance Monitoring in a Virtualized Environment," Network Instruments LLC, Corporate Headquarters, Minnetonka, Minnesota, 55343; 2009; pp. 1-5.
Solera Networks™; "Solera Networks Virtual Appliances Solera V2P Tap ™," Data Sheet; Solera Networks Headquarters, South Jordan, Utah, 84095; 2009; pp. 1-2.
VMtoday "Storage Basics—Part VII: Storage Alignment"; Apr. 25, 2011; pp. 1-4.

(Continued)

*Primary Examiner* — Than Nguyen
(74) *Attorney, Agent, or Firm* — Campbell Stephenson LLP (57) ABSTRACT

A method, system, and computer-readable storage medium for providing an adaptive tap for a virtual machine protection are disclosed. In one embodiment, an Input/Output (I/O) write is received from one of virtual machines. The virtual machines are executed on a server, and each virtual machine is configured to generate I/O writes to a VMFS file system on a primary storage. The I/O write includes data and an offset at which the data is to be stored in the VMFS file system. The server, and primary and secondary storage are coupled to a network. A virtual machine indicator is determined using the offset. A secondary write to a secondary storage is generated based on the I/O write. The secondary write includes the data and the VM indicator associated with the I/O write. The secondary storage is then accessed to write/store the secondary write.

20 Claims, 8 Drawing Sheets

(56) References Cited

OTHER PUBLICATIONS

VERITAS Software Corporation, VERITAS Storage Foundation *for Windows*; "The Dynamic Disk Advantage—Comparing Dynamic Disks to Basic Disks;" VERITAS Software Corporation Corporate Headquarters, Mountain View, California, 94043; 2003; pp. 1-16.

VMware® "How NPIV-Based LUN Access Works," Infrastructure 3 Online Library—ESX Server 3 Ed.; 2006; 1 page.

VMware®; "Performance Characteristics of VMFS and RDM-VMware ESX Server 3.0.1;" VMware, Inc., Palo Alto, California, 94304; 2007; pp. 1-11.

VMware®; "Recommendations for Aligning VMFS Partitions;" VMWare Infrastructure 3, Performance Study; VMware, Inc., Palo Alto, California, 94304; 2009; pp. 1-10.

VMware®; "Server Configuration Guide-ESX Server 3.0.1 and VirtualCenter 2.0.1," VMware, Inc., Palo Alto, California, 94304; 2009; pp. 1-312.

VMware®; VMWaare Virtual Machine File System: Technical Overview and Best Practices. A VMware Technical White Paper; Version1.0; VMware, Inc., Palo Alto, California, 94304; 2007; pp. 19 pages.

* cited by examiner

ADAPTIVE TAP FOR FULL VIRTUAL MACHINE PROTECTION

FIELD OF THE INVENTION

This invention relates to data processing systems, and in particular, managing virtual data processing systems. Still more particularly, this invention relates to managing continuous data protection and/or backup of virtual data processing systems.

DESCRIPTION OF THE RELATED ART

A distributed computing system can include multiple computing nodes (nodes) that communicate with and access, using a network, data stored on a shared storage device. Each such node can implement multiple virtual machines that allow increased usage of hardware resources, i.e., by effectively turning hardware resources of each node into several virtual machines. Each virtual machine can execute a separate operating system, and can be interacted with, and used in substantially the same manner as, standalone operating system executing on independent hardware.

The nodes in this distributed computing system should be protected against data loss due to failures or errors. One way to safeguard against such data loss is by implementing a continuous data protection (CDP) and/or a back-up system. A typical way of doing so it to use a backup application (e.g., an agent) on the nodes and/or virtual machines. This backup application can perform CDP and/or periodically backup the data stored on the shared storage device accessed by those nodes. In a CDP system, the agent can facilitate continuous saving (e.g., to secondary storage) of data that is written to the shared storage device. In the event of a failure that results in data loss or corruption, the data on the shared storage device can be recovered via a backup or data archive created by the backup application.

One drawback to using a backup application is that performing a backup of the entire shared storage device can be time and resource intensive (both in computing and network resources). A similar drawback to using a CDP system is that saving all of the data that is being written by a node can also be both time and resource intensive. Furthermore, the use of agents on the node(s) and/or virtual machines is invasive and adds complexity. Thus, what is desirable is an approach that enables an easier and more efficient technique to provide protection of data used by virtual machines in a distributed computing system.

SUMMARY OF THE INVENTION

Various systems and methods for providing an adaptive tap for a virtual machine protection are disclosed. For example, one method involves receiving an Input/Output (I/O) write from a first virtual machine of a plurality of virtual machines. The virtual machines are executed on a server, and each of the virtual machines is configured to generate one or more I/O writes to a VMFS file system on a primary storage. The I/O write comprises data and an offset at which the data is to be stored in the VMFS file system on the primary storage. The server and the primary storage are coupled to a network. The method also involves determining a virtual machine (VM) indicator using the offset. The method also involves generating a secondary write to a secondary storage based on the I/O write. The secondary storage is coupled to the network, and the secondary write includes the data and the VM indicator associated with the I/O write. The method also involves accessing the secondary storage to write the secondary write. The secondary storage is operable to store the data using the VM indicator.

In some embodiments, prior to the generating, the method includes determining whether the VM indicator indicates that the first virtual machine is to be provided with continuous data protection/back-up, where the generating and the accessing are performed if the first virtual machine is to be provided with the continuous data protection/back-up. In some embodiments, the VM indicator comprises one or more of a first virtual machine disk (VMDK) associated with the first virtual machine, or an indication of the first virtual machine. In some embodiments, the first virtual machine is configured to save a plurality of data using two or more VMDKs used by the VFMS file system on the primary storage, and the two or more VMDKs comprise the first VMDK. In some embodiments, the I/O write, as received from the first virtual machine, does not comprise the VM indicator. In some embodiments, the determining the VM indicator comprises querying a software entity on the at least one server using the offset to obtain the VM indicator. In some embodiments, the determining the VM indicator comprises accessing a map file on a tap device to obtain the VM indicator for the offset, where the map file comprises a plurality of mappings between offsets and corresponding VM indicators. In some embodiments, the method includes restoring the data for the first virtual machine from a plurality of data stored on the secondary storage. In some embodiments, the method includes monitoring the one or more I/O writes from the plurality of virtual machines, and selectively generating secondary writes for the one or more I/O writes to the secondary storage based on the monitoring. In some embodiments, the monitoring comprises analyzing one or more of the characteristics of the one or more I/O writes from each of the plurality of virtual machines, and the one or more characteristics comprise frequency or size of the one or more I/O writes from each of the plurality of virtual machines.

A system is disclosed that comprises a processing module, a mapping module, and a write generator. The processing module is configured to receive an Input/Output (I/O) write from a first virtual machine of a plurality of virtual machines. The virtual machines are executed on at least one server. Each of the virtual machines is configured to generate one or more I/O writes to a VMFS file system on a primary storage. The I/O write comprises data and an offset at which the data is to be stored in the VMFS file system on the primary storage. The at least one server and the primary storage are coupled to a network. The mapping module is coupled to the processing module and configured to determine a virtual machine (VM) indicator using the offset. The write generator is coupled to the processing module and is configured to generate a secondary write to a secondary storage based on the I/O write. The secondary storage is coupled to the network. The secondary write comprises the data and the VM indicator associated with the I/O write. The write generator is also configured to access the secondary storage to write the secondary write. The secondary storage is operable to store the data using the VM indicator.

In some embodiments, the VM indicator comprises one or more of a first virtual machine disk (VMDK) associated with the first virtual machine, or an indication of the first virtual machine. In some embodiments, the first virtual machine is configured to save a plurality of data using two or more VMDKs used by the VFMS file system on the primary storage, and the two or more VMDKs comprise the first VMDK. In some embodiments, the mapping module is configured to determine the VM indicator by performing at least one of querying a software entity on the at least one server using the offset to obtain the VM indicator, or accessing a map file on the tap device to obtain the VM indicator for the offset. The map file may comprise a plurality of mappings between offsets and corresponding VM indicators. In some embodiments, the processing module is further configured to monitor the one or more I/O writes from the plurality of virtual machines, and selectively generate secondary writes for the one or more I/O writes to the secondary storage based on the monitoring.

A computer readable medium is disclosed that contains program instructions that are executable by one or more processors. The program instructions are executable to receive an Input/Output (I/O) write from a first virtual machine of a plurality of virtual machines. The virtual machines are executed on at least one server. Each of the virtual machines is configured to generate one or more I/O writes to a VMFS file system on a primary storage. The I/O write comprises data and an offset at which the data is to be stored in the VMFS file system on the primary storage. The at least one server and the primary storage are coupled to a network. The program instructions are further executable to determine a virtual machine (VM) indicator using the offset. The program instructions are further executable to generate a secondary write to a secondary storage based on the I/O write. The secondary storage is coupled to the network. The secondary write comprises the data and the VM indicator associated with the I/O write. The program instructions are further executable to access the secondary storage to write the secondary write. The secondary storage is operable to store the data using the VM indicator.

In some embodiments, the VM indicator comprises one or more of a first virtual machine disk (VMDK) associated with the first virtual machine, or an indication of the first virtual machine. In some embodiments, the first virtual machine is configured to save a plurality of data using two or more VMDKs used by the VFMS file system on the primary storage, and the two or more VMDKs comprise the first VMDK. In some embodiments, the program instructions are executable to determine the VM indicator by performing at least one of querying a software entity on the at least one server using the offset to obtain the VM indicator, or accessing a map file on the tap device to obtain the VM indicator for the offset, where the map file comprises a plurality of mappings between offsets and corresponding VM indicators. In some embodiments, the program instructions are further executable to monitor the one or more I/O writes from the plurality of virtual machines, and selectively generate secondary writes for the one or more I/O writes to the secondary storage based on the monitoring.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Embodiments of the present invention are directed to using an adaptive tap (also referred to as a tap device) to provide selective data protection for one or more virtual machines. The virtual machines may be implemented by one or more nodes in a distributed computing system. Each virtual machine (also referred to as "VM") may, for example, provide a self-contained instance of an executing operating system. Each virtual machine may access, e.g., over a network, primary storage to perform I/O reads and writes. The primary storage may use a Virtual Machine File System (VMFS) file system for storing data received from the virtual machines. The tap device can couple to the network and be able to receive the I/O writes from the nodes that implement the virtual machines. The tap device can determine which VM has generated each respective I/O write, and only generate secondary writes for certain VMs. The tap device can access secondary storage to store data using these secondary writes. As a result, the secondary storage may only store data that was contained in I/O writes from these certain virtual machines.

Figure 1:
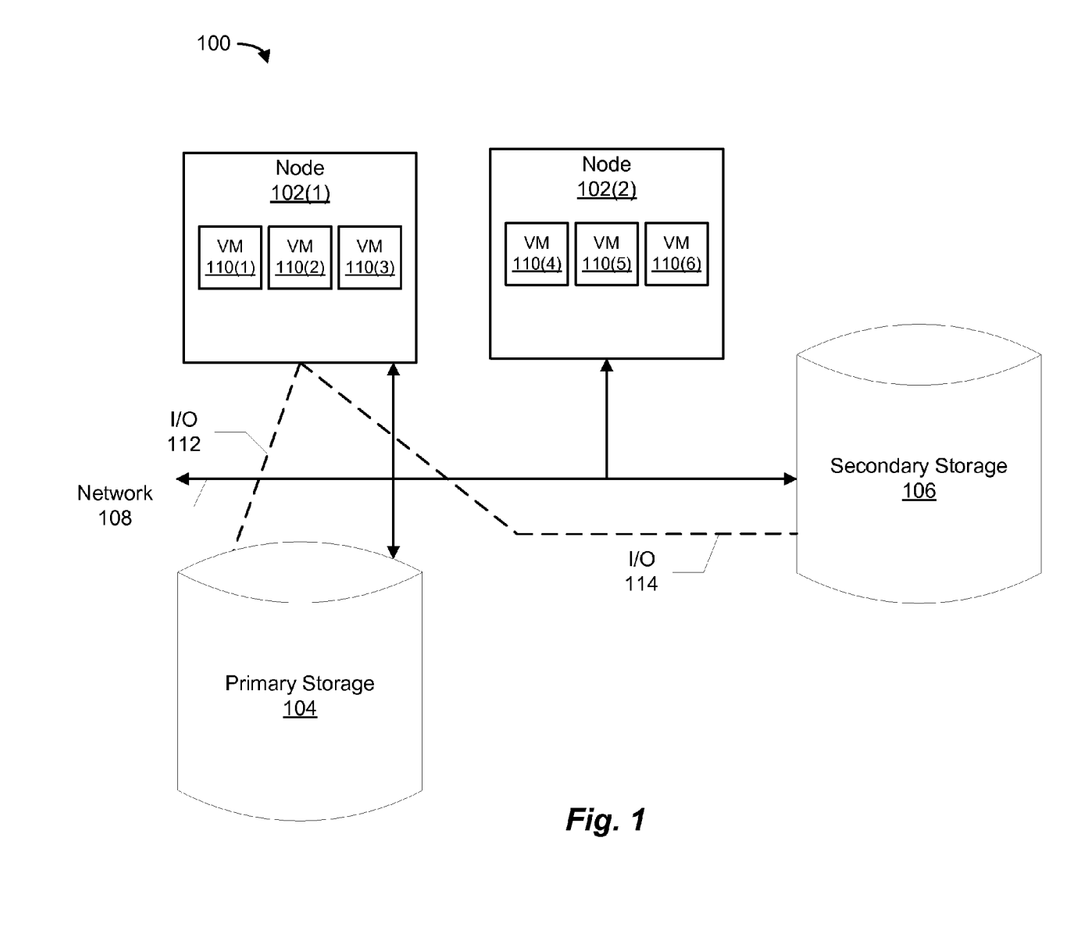
FIG. 1 is a block diagram illustrating a system that includes a collection of nodes and a primary and secondary storage, according to one embodiment.

FIG. 1 is a block diagram illustrating a conventional system 100 that includes a collection of nodes and a primary and secondary storage. System 100 includes two nodes 102(1) and 102(2), a primary storage 104, a secondary storage 106, and a network 108. Each node 102(1) and 102(2) can communicate with primary storage 104 and secondary storage 106 using network 108. Although only two nodes 102(1) and 102(2) are shown, system 100 may include a different number of nodes. Each node 102(1) and 102(2) can implement one or more virtual machines 110(1)-110(6). In some embodiments, each node 102(1) and 102(2) may implement virtual machines using hypervisor technology, although other designs are contemplated. Nodes 102(1) and 102(2) communicate with each other via network 108. Nodes 102(1) and 102(2) can also communicate with primary storage 104 and/or secondary storage 106 using network 108.

Each of primary storage 104 and secondary storage 106 may be a shared storage device, such as a cluster shared volume. For example, primary storage 104 may be implemented as a collection of hard disk drives aggregated to form at least one volume accessible for read and write operations by nodes 102(1) and 102(2) in distributed computing system 100. According to some embodiments, primary storage 104 can be formatted using a Virtual Machine File System (VMFS), such as offered by VMWARE, INC. of Palo Alto, Calif., or a similar file system that can be used by multiple virtual machines. Virtual machines 110(1)-(6) can perform I/O reads and writes to primary storage 104, such as to read and write data.

In some embodiments, primary storage 104, by implementing VMFS, can allow multiple nodes 102(1) and 102(2) to store data. In other embodiments, primary storage 104 may implement Network File System (NFS) and operate in a similar manner as described herein. In one embodiment, primary storage 104 can be implemented using remote device mapping (RDM). When implemented using VMFS, primary storage 104 may include one or more VMFS volumes. In one embodiment, each VMFS volume may be stored on a separate cluster of primary storage 104. In other embodiments, each VMFS volume may be distributed among various clusters of primary storage 104, or multiple VMFS volumes may be implemented on a single cluster of primary storage 104, as desired. Each VMFS volume may correspond to a separate logical unit number (LUN). Each VMFS volume can be divided into multiple Virtual Machine DisKs (VMDKs). In one embodiment, the VMFS volume on primary storage 104 can have multiple VMDKs (not illustrated).

For example, with reference to FIG. 1, primary storage 104 may implement one VMFS volume. Each VM 110(1)-110(6) may be associated with at least one distinct VMDK on primary storage. For example, VM 110(1) may be associated with a first VMDK, and VM 110(2) may be associated with a second VMDK. However, in some implementations, each VM 110(1)-110(6) may be associated with multiple distinct VMDKs. For example, VM 110(1) may be associated with two VMDKs on a single VMFS volume on primary storage 104.

Nodes 102(1) and 102(2) can also couple via network 108 to secondary storage 106. Secondary storage 106 can be used for providing data protection and/or back-up for virtual machines 110(1)-110(6) using any one of various data protection/back-up techniques. Typically, each node 102(1) and 102(2) may be implemented using a server, including one or more processors, memory, bus, etc. One example implementation of such a server is described below with reference to FIG. 8. Network 108 may be implemented as any one or more wired and/or wireless networks, including any combination of a local area network (LAN), and/or a storage area network (SAN), etc.

Each virtual machine 110(1)-110(6) may be a software implementation of a physical computer that executes computer instructions in the manner of physical computer hardware. Virtual machines 110(1)-110(6) may read and write data, i.e., using I/O writes 112, to primary storage 104. As mentioned above, virtual machines 110(1)-110(6) and/or nodes 102(1) and 102(2) may also implement (e.g., by using agents) a data protection/back-up plan, such that would generate additional I/O writes 114 to secondary storage 106. However, implementations of such data protection/back-up plans by virtual machines 110(1)-110(6) and/or nodes 102(1) and 102(2) may be costly in terms of complexity, usage of processing power, and even maintenance costs.

Figure 2:
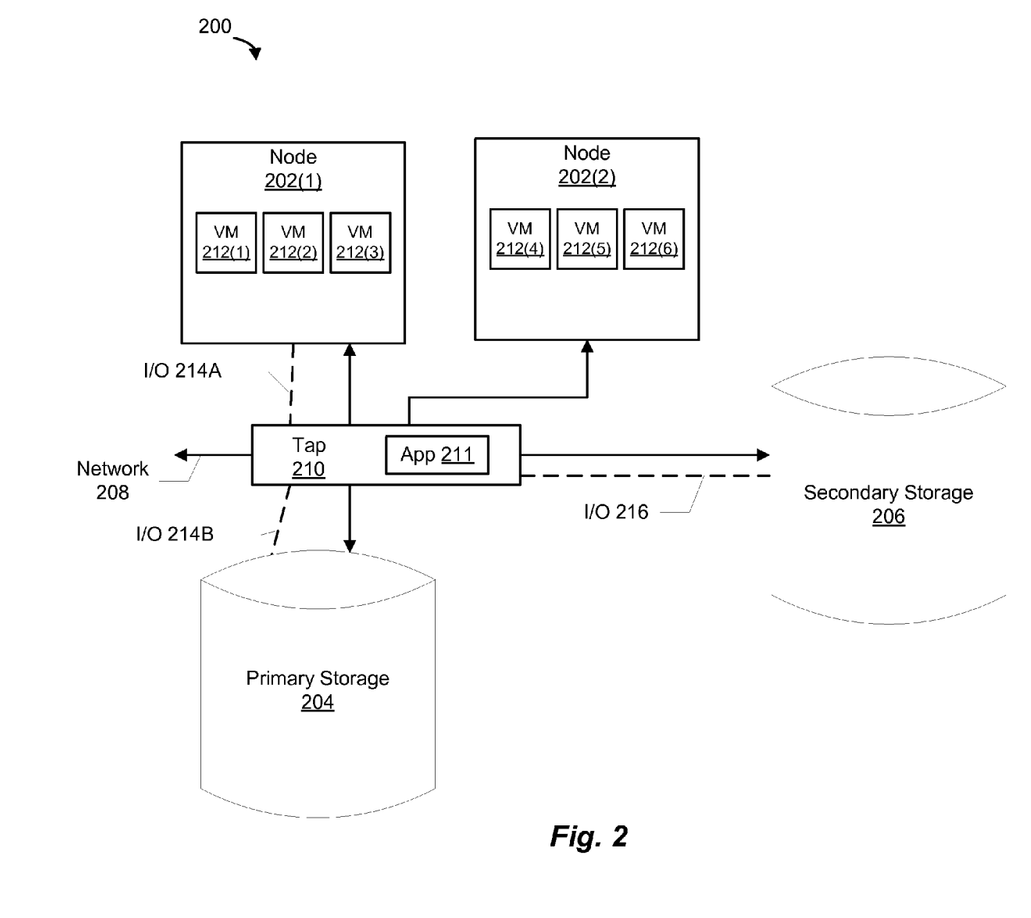
FIG. 2 is a block diagram illustrating a collection of nodes, primary and secondary storage, and a tap device, according to one embodiment.

FIG. 2 is a block diagram illustrating a system 200 that includes a collection of nodes, primary and secondary storage, and a tap device, according to one embodiment. System 200 includes two nodes 202(1) and 202(2), a primary storage 204, a secondary storage 206, a network 208, and a tap device 210. Each of two nodes 202(1) and 202(2) can communicate with primary storage 204 and secondary storage 206 using network 208. Although only two nodes 202(1) and 202(2) are shown, system 200 may include a different number of nodes. Each node 202(1) and 202(2) can implement virtual machines 212(1)-212(6), using hypervisor technology, although other designs are contemplated. Nodes 202(1) and 202(2) communicate with each other via network 208.

Nodes 202(1) and 202(2) can also couple via network 208 to secondary storage 206. Secondary storage 206 can be used for providing data protection/back-up for virtual machines 212(1)-212(6). Typically, each node 202(1) and 202(2) may be implemented using a server, including one or more processors, memory, bus, etc. One example implementation of such a server is described below with reference to FIG. 8.

Each of primary storage 204 and secondary storage 206 may be a shared storage device, such as a cluster shared volume, similar to primary storage 104 and secondary storage 106 of FIG. 1, respectively. According to some embodiments, primary storage 204 can be formatted using VMFS, or a similar file system (e.g., NFS) that can be accessed by multiple virtual machines. Primary storage 204 may implement one or more VMFS volumes, each having multiple VMDKs, such as described above with reference to FIG. 1.

In some embodiments, each I/O write from virtual machine 212(1)-212(6) may include data and an offset at which that data is to be stored in a VMFS file system on primary storage 204. Primary storage 204 may, upon receiving each of these I/O writes, store data for each respective I/O write using the corresponding offset in the VMFS file system. However, it may not be readily known, just by accessing the VMFS file system on primary storage 204, which of the virtual machines 212(1)-212(6) has generated each I/O write. For example, primary storage 204 may receive an I/O write 214B that includes data and an offset. However, primary storage 204 may use an internal algorithm to determine which VMDK on the VMFS volume corresponds to the offset for I/O write 214B. Primary storage 204 may, for example, determine that the offset of I/O write 214B corresponds to a third VMDK on a first VMFS volume. In one embodiment, primary storage 204 may not be aware (e.g., just from the offset and/or the determined VMDK) which virtual machine 212(1)-212(6) generated this I/O write 214B.

Network 208 may be implemented as any one or more wired and/or wireless networks, including any combination of a local area network (LAN), and/or a storage area network (SAN), etc. Network 208 may be substantially similar to network 108. As shown in FIG. 2, each of two nodes 202(1) and 202(2), primary and secondary storage 204 and 206, respectively, and tap device 210, can communicate with each other using network 208.

Tap device 210 can monitor/access substantially all I/O reads and writes from nodes 202(1) and 202(2), such as from virtual machines 212(1)-212(6), to primary storage 204. In some embodiments, tap device 210 is also configured to generate secondary writes to secondary storage 206. Tap device 210 may propagate/pass-through the I/O reads and writes to access primary storage 204. Typically, during normal (e.g., non-recovery) operation, selected I/O writes from virtual machines 212(1)-212(6) are propagated to secondary storage

206. Tap device 210 may select a subset of these I/O writes (e.g., I/O writes for accessing primary storage 204) to be stored at secondary storage 206, as described below.

Tap device 210 includes a tap application 211. Tap application 211 may access the I/O writes from nodes 202(1)-(2) (e.g., from virtual machines 212(1)-(6)). In some embodiments, tap application 211 may access substantially all I/O reads and writes from nodes 202(1)-(2). Typically, during normal (e.g., non-recovery) operation, tap application 211 only propagates I/O writes to secondary storage 206. Tap application 211 may propagate (e.g., pass-through) substantially all of these I/O reads and writes to access primary storage 204. Tap application 211 may selectively generate secondary I/O writes from a subset of these I/O writes for accessing secondary storage 206.

For example, the I/O writes may include an I/O write 214A from a first virtual machine 212(1). I/O write 214A may include data and an offset (e.g., an offset as used by the VMFS file system). Tap application 211 may allow I/O write 214A to pass through, such as by propagating I/O write 214A to primary storage 204. As a result, primary storage 204 may receive I/O write 214B that is the same, or substantially the same to I/O write 214A. In some implementations, tap device 210 may propagate I/O write 214A as I/O write 214B without any noticeable delay in time.

In some embodiments, tap application 211 may determine a virtual machine indicator (VM indicator) for I/O write 214A. The VM indicator may include a virtual machine disk (VMDK) identifier associated with, and/or an indication of, the virtual machine that generated that I/O write 214A (i.e., first virtual machine 212(1)). Tap application 211 may implement continuous data protection/back-up only for certain virtual machines. In accordance with the example above, tap application 211 may be configured to provide continuous data protection/back-up for virtual machine 212(1), but not for other virtual machines 212(2)-212(6). For example, upon determining that VM indicator for I/O write 214A indicates virtual machine 212(1), tap application 211 may generate a secondary write 216.

Tap application 211 may propagate I/O write 214A, i.e., as I/O write 214B, to primary storage 204 regardless of the outcome of this determination. Tap application 211 can selectively generate secondary write 216 that corresponds to I/O write 214A. In one embodiment, secondary write 216 includes the data (e.g., data contained in first I/O write 214A) and the VM indicator (e.g., indicating that first virtual machine 212(1) generated I/O write 214A). In one embodiment, secondary write 216 may also include the offset included in first I/O write 214A.

Secondary storage 206 may store secondary write 216 using a variety of techniques. For example, secondary storage 206 may be implemented using VMFS. In this case, secondary storage 206 may store data of secondary write 216 at an offset at an VMDK (but also including the VM indicator). In some embodiments, secondary storage 206 may implement a continuous data protection (CDP) system, as described below. In this case, secondary storage 206 may store data of secondary write 216 in accordance with the given CDO implementation.

Each virtual machine 212(1)-(6) may be a software implementation of a physical computer that executes computer instructions in the manner of physical computer hardware. Virtual machines 212(1)-(6) may read and write data, i.e., using I/O writes, to primary storage 204. Each virtual machine 212(1)-(6) may be software implementations of a physical computer that execute computer instructions in the manner of physical computer hardware. Virtual machines 212(1)-(6) may read and write data, i.e., using I/O writes, to primary storage 204. Each virtual machine 212(1)-(6) may be similar to VMs 110(1)-(6) of FIG. 1. Virtual machines 212(1)-(6) can perform I/O reads and writes to primary storage 204, such as to read and write data.

Figure 3:
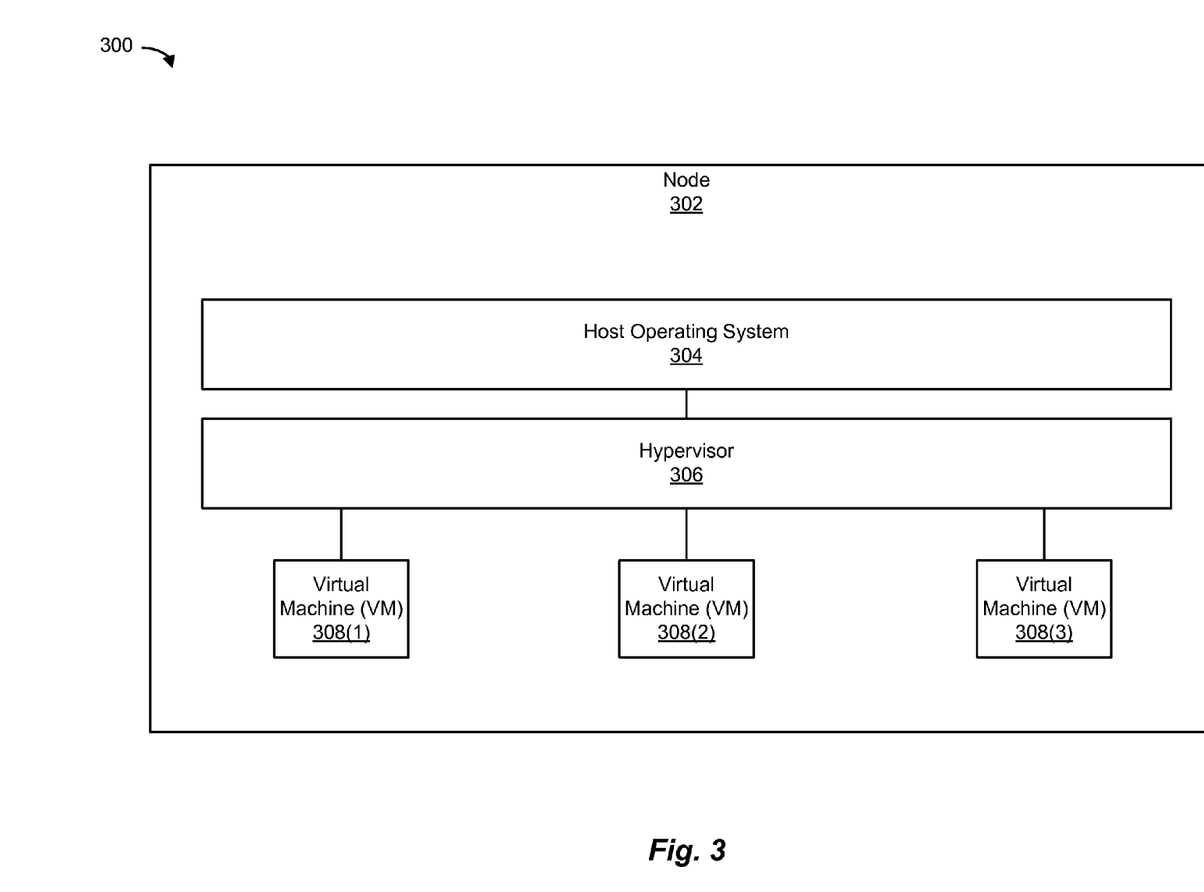
FIG. 3 is a block diagram illustrating a node, according to one embodiment.

FIG. 3 is a block diagram 300 of a node 302, according to one embodiment. Node 302 may be an example implementation of any of nodes 102(1)-102(2) and/or nodes 202(1)-202(2). As illustrated, node 302 includes a host operating system 304, a hypervisor 304, and virtual machines 308(1)-308(3). It is noted that is some embodiments, one or more of these elements may be combined. For example, host operating system 304 and hypervisor may be implemented as one software and/or hardware module. It is also noted that in some embodiments one or more of elements of node 302 may not be used. For example, node 302 may be implemented as a server that directly implements virtual machines 308(1)-308(3), without using a hypervisor.

Host operating system 304 is the operating system that enables execution of hypervisor 306. Node 302 may also include a change tracker (not shown) that may keep track of changes to data made to the primary storage (e.g., primary storage 204 of FIG. 2) by node 302, e.g., on behalf of virtual machines 308(1)-308(3). The changes to data may be recorded by change tracker in a local change list.

Hypervisor 306 may be implemented in software and/or hardware, and may provide node 302 the ability to concurrently support virtual machines 308(1)-308(3). Hypervisor 306 may provide such ability by coordinating the distribution of computer resources (e.g., processing power, memory, etc.) among virtual machines 308(1)-308(3), so that virtual machines 308(1)-308(3) operate similarly to physical computers. Virtual machines 308(1)-308(3) may be implemented in software (i.e., of node 302) and execute computer instructions similarly to physical hardware. Each virtual machine 308(1)-308(3) may be able to operate as if the host computer (e.g., node 302) were solely under that virtual machine's control, and so share the host computer system's resources. Hypervisor 306 may act as a coordinator or manager of computing resources (e.g., such as processor(s), memory, etc.) of node 302. Hypervisor 306 supports multiple virtual machines 308(1)-308(3) by coordinating processor resources to support the execution of instructions on behalf of various virtual machines 308(1)-308(3), and performing memory management to help ensure that the virtual machines effectively share node's 302 system memory, for example.

Each virtual machine (VM) 308(1)-308(3) can be implemented using the same or different operating systems. A client interacting with a VM 308(1)-308(3) will typically interact in substantially the same manner that a client would interact with a standalone operating system operating on independent hardware. Virtual machines 308(1)-308(3) can be implemented using virtualization software, such as that provided by VMWARE.

Figure 4:
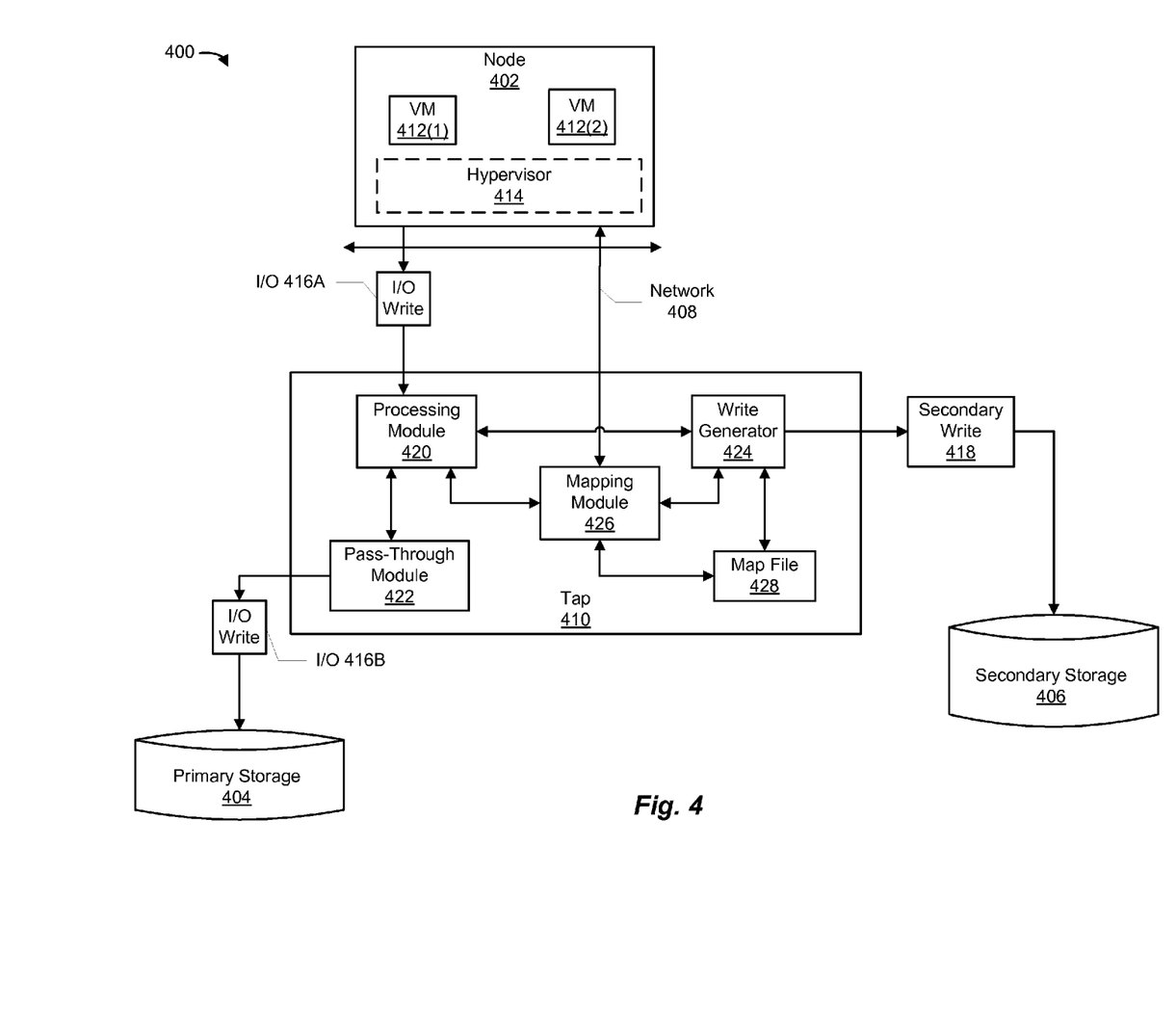
FIG. 4 is a detailed block diagram of a system that includes a node, a primary and secondary storage, and a tap device, according to one embodiment.

FIG. 4 is a detailed block diagram of a system 400 that includes a node 402, a primary and secondary storage 404 and 406, respectively, a network 408, and a tap device 410, according to one embodiment. Node 402, primary storage 404, secondary storage 406, and tap device 410 may be coupled to, and communicate between each other, using network 408. FIG. 4 shows a more detailed view of system 200 of FIG. 2. It is noted that is some embodiments, one or more of these elements may be combined. For example, various elements of tap device 410 may be may be implemented as one software and/or hardware module, as desired. It is also noted that in some embodiments, one or more of elements of tap device 410 may not be used.

Node 402 includes at least one virtual machine, such as any virtual machine 412(1) or 412(2). Each virtual machine 412(1) or 412(2) may operate in manner similar to that described with reference to FIG. 3. Node 402 may also include a hypervisor 414. Hypervisor, in one embodiment, may facilitate the execution of virtual machines 412(1) and/or 412(2), such as in manner described with reference to FIG. 3. Node 402 (e.g., virtual machine 412(1) or 412(2)) may generate I/O writes to primary storage 404. For example, virtual machine 412(1) can generate an I/O write 416A. I/O write 416A includes various elements, including an offset in a VMFS file system of primary storage 404 and data to be written at the offset in the VMFS file system of primary storage 404.

Primary storage 404 and secondary storage 406 may be of any type of storage, such as described above with reference to FIGS. 1 and/or 2. Primary storage 404 may use a VMFS file system, such as provided by VMWARE. Primary storage 404 may allow data to be stored by nodes and/or virtual machines, such as by receiving and processing I/O writes from node 402 and/or virtual machines 412(1) and 412(2). Primary storage 404 may also allow stored data to be read by nodes and/or virtual machines, such as by receiving and processing I/O reads from node 402 and/or virtual machines 412(1) and 412(2). For example, primary storage 404 may receive and process I/O write 416B that includes data and offset. Primary storage 404 may process I/O write 416B such as by using the offset to determine where in the VMFS file system to store the data. For example, primary storage 404 may store data of I/O write 416B by accessing an appropriate VMDK of an VMFS volume, as is indicated by the offset.

Secondary storage 406 is configured to receive and store I/O writes, including a secondary I/O write 418. In one embodiment, secondary storage 406 is configured to operate in similar manner to that of primary storage 404, such as simply receiving and processing I/O writes as described above. In some embodiments, secondary storage 406 is configured to operate as a continuous data protection (CDP) system and/or a back-up system, such as described below with reference to FIG. 6. In one implementation, secondary write 418 may include additional data elements that are not found in I/O write 416A and/or 416B. For example, secondary write 418 may include a VM indicator, such as a virtual machine disk (VMDK) associated with virtual machine 412(1), and/or an indication of virtual machine 412(1). The indication of virtual machine 412(1) may, in one embodiment, simply indicate that virtual machine 412(1) is the virtual machine that initially generated I/O write 416A.

Secondary storage 406 may store data that is included in secondary write 418 along with the VM indicator. As a result, during a recovery operation, secondary storage 406 may be able to easily locate any data that was generated by a specific virtual machine, such as virtual machine 412(1). For example, a data recovery operation may want to only recover data that for virtual machine 412(1), and not any of the other virtual machines.

Network 408 may be any type of a network, including a local area network (LAN), a storage area network (SAN), etc. For example, network 408 may be implemented using Ethernet, FibreChannel, and/or any other type of LAN/SAN. Network 408 connects nodes (e.g., node 402) together with storage devices, e.g., primary storage 404 and secondary storage 406. Network 408 facilitates communication (e.g., I/O access such as I/O reads and writes) between node 402 and storage devices 404 and 406. In addition, tap device 410 may couple to network 408 and monitor and/or propagate I/O reads and writes.

Tap device 410 includes a processing module 420, a pass-through module 422, a write generator 424, a mapping module 426, and a map file 428. In one embodiment, tap device 410 illustrates a more detailed view of tap device 210 of FIG. 2. In one implementation, tap application 211 of FIG. 2 may be implemented using one or more of processing module 420, pass-through module 422, write generator 424, mapping module 426, and/or map file 428.

In one embodiment, processing module 420 receives I/O write 416A. Processing module 420 may process I/O write 416A, such as by communicating with mapping module 426, write generator 424, and/or pass-through module 422. In one embodiment, processing module 420 may use mapping module 426 (such as by passing an offset that is included in I/O write 416A) to determine which virtual machine generated the I/O write 416A.

The I/O writes that use the VMFS file system, such as I/O write 416A, usually include data and an offset. This offset typically indicates a location in a VMFS file system where the data is to be written. For example, the offset can be used by primary storage 404 to store the data at a certain VMDK, as described above.

Processing module 420 of tap device 410 may be pre-configured, such as by a user or a system administrator, to provide CDP/back-up for I/O writes from a selected virtual machine. For example, tap device 420 may be pre-configured to only provide CDP/back-up for I/O writes from virtual machine 412(1), but not virtual machine 412(2) or any other virtual machine from node 402 or any other nodes. In some embodiments, the user or the system administrator can change, e.g., by accessing processing module 420, which virtual machine is to be provided with CDP/back-up.

In some embodiments, processing module 420 can dynamically and/or automatically select which virtual machines are to be provided with CDP/back-up. Processing module 420 can monitor the I/O writes from the virtual machines on node 402 (and/or other nodes on network 408). Processing module 420 can selectively generate secondary writes from the I/O writes to secondary storage 406 based on the monitoring. Processing module 420 can monitor the I/O writes (from VMs 412(1)-412(2)), and then analyze various characteristics of these I/O writes. These characteristics include frequency and size of the data of these I/O writes. For example, processing module 420 can analyze a frequency of I/O writes from each virtual machine on node 402. Depending on desired characteristics, processing module 420 can select to provide CDP/back-up for only a virtual machine that most frequently performs I/O writes. In another example, processing module 420 may be initially set-up (e.g., by the administrator) to provide CDP of I/O writes from both virtual machines 412(1) and 412(2). However, based on monitoring of the I/O traffic through tap device 410 to primary storage 404, processing module 420 may dynamically select only to provide CDP for I/O writes from virtual machine 412(1) (and/or any other selected virtual machine).

Mapping module 426 may determine a VM indicator for the offset of I/O write 416A. In some embodiments, mapping module 426 may query, using the offset, a software entity on node 402 to obtain the VM indicator. For example, the software entity (that is queried by mapping module 426) includes some portion of an operating system of node 402, or a hypervisor 414 of node 402. The software entity may then return the VM indicator that is associated with the offset of I/O write 416A. The VM indicator includes a VMDK associated with the virtual machine that generated I/O write 416A, or an indication of that virtual machine (such as a reference or identification of virtual machine 412(1)).

In one embodiment, mapping module 426 may query an Application Programming Interface (API) that is implemented by the software entity on node 402. For example, node 402 may implement one or more VMWARE APIs that can be queried by mapping module 426, such as via network 408. In one embodiment, the software entity may implement an API command that returns a VM indicator. For example, node 402 may be programmed with a getVMDK (ESXid, offset_on_ESX) that returns a VMDK id for an offset on a given hypervisor (ESX) on that node 402. In some embodiments, mapping module 426 may call other API(s) on node 402 in addition to, or instead of, the one described above. For example, mapping module 426 may call a queryChangedDiskAreas function on node 402.

In some embodiments, mapping module 426 may access map file 428 that includes the VM indicator for the offset of I/O write 416A. For example, mapping module 426 may create map file 428 that includes a plurality of mappings of offsets to VM indicators. In some embodiments, mapping module 426 may create map file 428 prior to processing the I/O writes. In one embodiment, mapping module 426 can also first use map file 428 to find a VM indicator that corresponds to a given offset. If map file 428 does not contain that given VM indicator, mapping module 426 can then query the software entity on node 402 for the VM indicator. Mapping module 426 can then return the VM indicator to processing module 420. In one implementation, map file 428 may store VMDKs for a range of offsets. For example, offset 1 to 6,000 could map to a first VMDK, offset 6001 to 12,000 could map to a second VMDK, etc.

Processing module 420 can, if the VM indicator of an I/O write indicates a virtual machine that is to be provided with CDP/back-up, selectively generate secondary writes to secondary storage 406. For example, if VM indicator associated with I/O write 416A indicates that virtual machine 412(1) generated I/O write 416A, processing module 420 may request that write generator 424 generates a secondary write, e.g., a secondary write 418, to be stored at secondary storage 406. On the other hand, if VM indicator associated with I/O write 416A indicates another virtual machine 412(2)-412(6) generated I/O write 416A, and only VM 412(1) is to be provided with CDP/back-up, processing module 420 may just use pass through module 422 to propagates I/O write 416A, as I/O write 416B, to be stored at primary storage 404. In some embodiments, I/O writes (e.g., 416B) propagated by pass-through module 422 are substantially similar to the I/O writes (e.g., 416A) received by tap device 410. It is noted that I/O write 416A is propagated as I/O write 416B to primary storage 404 regardless of whether the VM indicator indicates a virtual machine that is to be provided with CDP/back-up, only secondary writes are selectively generated.

Write generator 424 generates secondary writes (e.g., secondary write 418) to secondary storage 406 based on the original I/O writes (e.g., I/O write 416A). Write generator generates secondary writes as requested by processing module 420. Each secondary write includes the data of the original I/O write and the VM indicator associated with that I/O write. For example, write generator 424 may generate secondary write 418 that includes the data included in I/O write 416A. Secondary write 418 may also include the VM indicator associated with I/O write 416A as well as the offset of I/O write 416A. Write generator then can access secondary storage 406 to write secondary write 418. Secondary storage 406 is operable to store the data included in secondary write 418 using the VM indicator.

Figure 5:
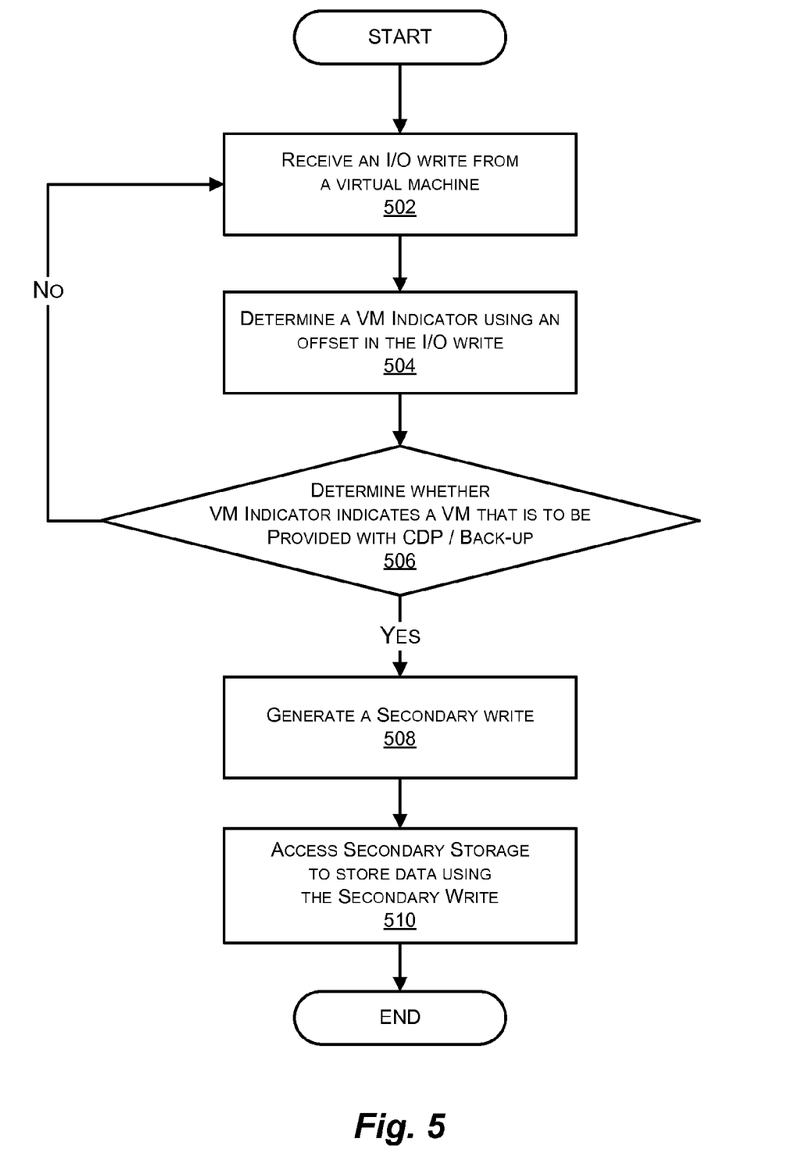
FIG. 5 is a flowchart illustrating a method for using a tap device in a distributed computing system, according to one embodiment.

Referring now to FIG. 5, one embodiment of a method 500 for using a tap device in a distributed computing system is disclosed. Method 500 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. Method 500 is described with reference to FIG. 4.

In step 502, an I/O write is received from a virtual machine. In some embodiments, processing module 420 of tap 410 can receive I/O write 416A from node 402. I/O write 416A includes data and offset. Although virtual machine 412(1) may be generating this I/O write 416A, I/O write 416A itself does not indicate which virtual machine generated the I/O write 416A. I/O write 416A also does not indicate which VMDK (i.e., on the VMFS file system of primary storage 404) that I/O write 416A is accessing.

In step 504, a VM indicator is determined using an offset in the I/O write. In some embodiments, processing module 420 can communicate with mapping module 426 to determine the VM indicator. Mapping module 426 may query a software entity (e.g., an operating system, a hypervisor, and/or virtual machine(s)) on node 402 using the offset in I/O write 416A. This software entity may then return a VM indicator, which may be a virtual machine disk (VMDK) associated with the virtual machine (i.e., VM 412(1)) that generated I/O write 416A, or an indication of virtual machine 412(1). In some embodiments, mapping module 426 may access map file 428 to determine the VM indicator, e.g., instead of, or before, querying the software entity on node 402. The VM indicator may be communicated by mapping module 426 to processing module 420. In some embodiments, processing module 420 may keep a local cache of most-frequently and/or most recently used offsets and corresponding VM indicators. In accordance with these embodiments, processing module may itself make a determination of the VM indicator, without communicating with mapping module 426.

In step 506, it is determined whether the VM indicator indicates a virtual machine that is to be provided with CDP/back-up. In some embodiments, processing module 420 may make this determination. For example, processing module 420 may include a list (and/or any other data structure) listing VM indicators (e.g., indications of virtual machines) that should be provided with CDP/back-up by tap device 410. If it is determined that the VM indicates a virtual machine that is to be provided with CDP/back-up, execution of the method 500 continues at step 508. If it is determined that the VM indicates a virtual machine that is not to be provided with CDP/back-up, execution of the method 500 continues at step 502.

In some embodiments, if it is determined that the VM indicates a virtual machine that is not to provided with CDP/back-up, processing module 420 may communicate with pass-through module 422 to forward (e.g., pass-through) I/O write 416A as I/O write 416B. In some implementations, I/O write 416A and 416B are substantially similar. I/O write 416B is then propagated to primary storage 404, which then can store data of I/O write 416B using the corresponding offset.

In step 508, if the VM indicator indicates a virtual machine that is to be provided with CDP/back-up, a secondary write is generated. In some embodiments, processing module 420 may communicate with write generator 424 to generate secondary write 418 based on I/O write 416A. Write generator 424 may generate secondary write 418 that is propagated to secondary storage 406. Write generator 424 may generate secondary write 418 that is compatible with the CDP/back-up technique used by secondary storage 406. In some embodiments, secondary write 418 includes data of I/O write 416A and the determined VM indicator (i.e., as determined in step 506). Secondary write 418 may also include the offset of I/O write 416A.

In addition to the generation of secondary write 418, processing module 420 may communicate with pass-through module 422 to forward (e.g., pass-through) I/O write 416A as I/O write 416B. I/O write 416B is then propagated to primary storage 404, which then can store data of I/O write 416B using the corresponding offset. In other words, I/O write 416A is propagated as I/O write 416B to primary storage 404 regardless of whether the VM indicator is associated with a VM that is to be provided with CDP/back-up.

In step 510, the secondary storage is accessed to store the data using the secondary write. In some embodiments, write generator 424 may access secondary storage 406 using secondary write 418, such as by propagating secondary write 418 to secondary storage 406. Secondary storage 406 may then store data of secondary write 418 using the VM indicator, and optionally also the offset, of secondary write 418.

Figure 6:
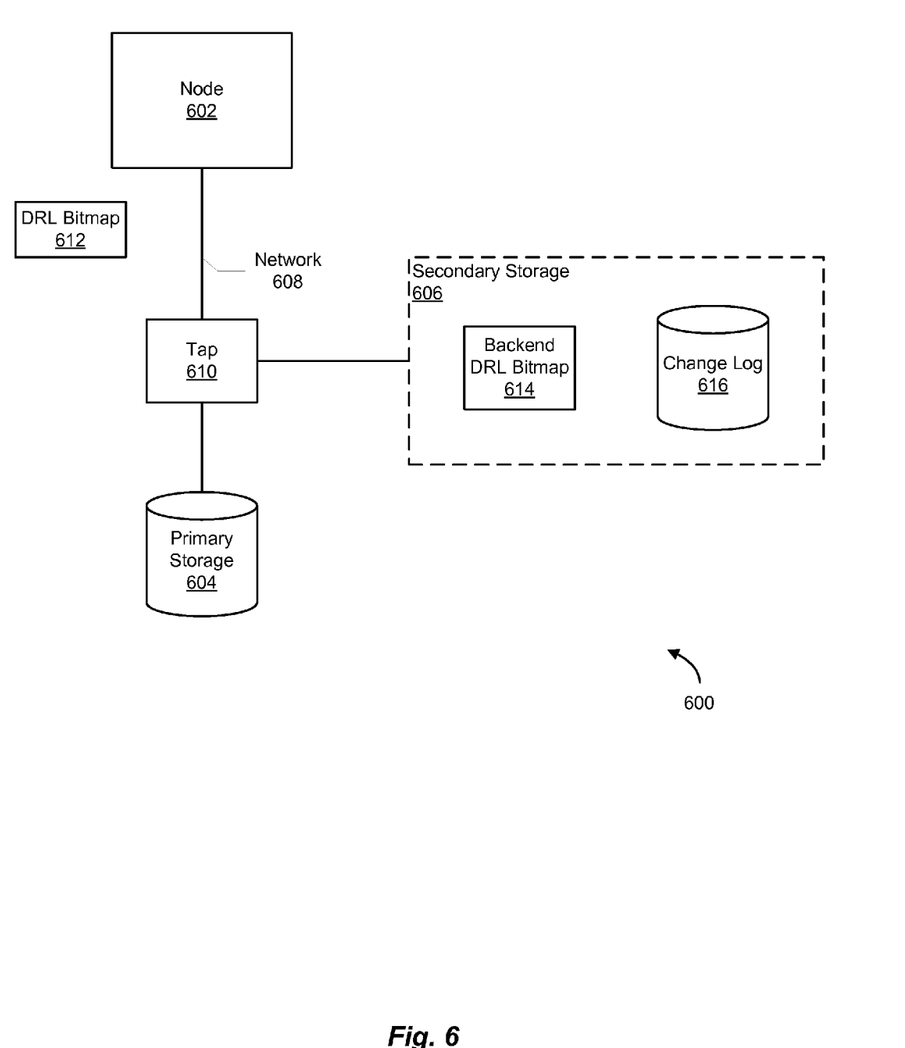
FIG. 6 is a block diagram illustrating a system that implements continuous data protection, according to one embodiment.

FIG. 6 is a block diagram of a system 600 illustrating continuous data protection (CDP), according to one embodiment. In some embodiments, system 600 includes a node 602, a tap device 610, and a secondary storage 606. The continuous data protection of FIG. 6 is one of several techniques for storing data on a secondary storage that can be used with the tap device described herein.

Node 602 may be implemented as node 402 of FIG. 4. In some embodiments, node 602 may implement dirty region logging (DRL) bitmap 612. In one embodiment, a region is a logical portion of a volume (e.g., in primary storage 604) that is defined and used by DRL. When DRL is enabled for a volume (e.g., in primary storage 604), a DRL bitmap 612 is created that represents this volume. When a region in this volume is modified (e.g., by an I/O write by a VM on node 602), a corresponding bit in DRL bitmap 612 is marked dirty before this I/O write is made to the volume. After the I/O write operation completes to the volume, DRL 612 doesn't remove the dirty bit. The bit isn't removed until it is the "least recently used." This DRL technique may be implemented in conjunction with secondary storage 606 being configured as a CDP backend. In accordance with this DRL technique, secondary storage 606 also includes a backend DRL bitmap 614 and a change log 616.

In some embodiments, this dirty bit may be also communicated (e.g., by node 602) to secondary storage 606 (i.e., CDP backend 606). CDP backend 606 may implement a two-stage commit technique, such as using a separate flag or state for this dirty bit. In some embodiments, the dirty bit may be marked by CDP backend 606 prior to generating and/or sending of a secondary write that corresponds to the I/O write for this dirty bit. Once primary storage 604 completes this I/O write (e.g., by successfully storing data of this I/O write), primary storage 604 may communicate a notification of a successful write back to node 602, which may then update the corresponding location in DRL bitmap (but may still wait for the secondary write to complete successfully). In some embodiments, CDP backend 606 may also keep track of a change log 616 that keeps track of changes to data for the virtual machine(s) that are to be provided with CDP/back-up.

Furthermore, once secondary storage 606 successfully completes a corresponding I/O write (e.g., of the secondary write), secondary storage 606 may update its own backend DRL bitmap 614 with a notification of a successful secondary write. In some embodiments, secondary storage 606 (i.e., CDP backend 606) may communicate a notification of a successful write at secondary storage 606 back to node 602, which may then update the corresponding location in DRL bitmap. Therefore each bit in the DRL bitmap 612 on node 602 may not be totally updated until notifications are received from both primary storage 604 and secondary storage 606. In some embodiments, tap device 610 communicates with node 602 to only use the secondary storage notifications of DRL bitmap 612 for virtual machines that are to be provided with CDP/back-up. DRL bitmap 612 may only be used for virtual machines that are to be provided with CDP/back-up.

In some embodiments, when other CDP/back-up techniques are used (e.g., instead of the CDP technique described above), secondary storage 606 may be correspondingly configured in conjunction with tap device 610. For example, secondary storage 606 may be configured to send successful secondary write notifications to tap device 610 and/or node 602 for each secondary write that is successfully stored on secondary storage 606.

Elements of network architecture can be implemented using different computer systems and networks. An example of one such network environment is described below with reference to FIG. 7.

Figure 7:
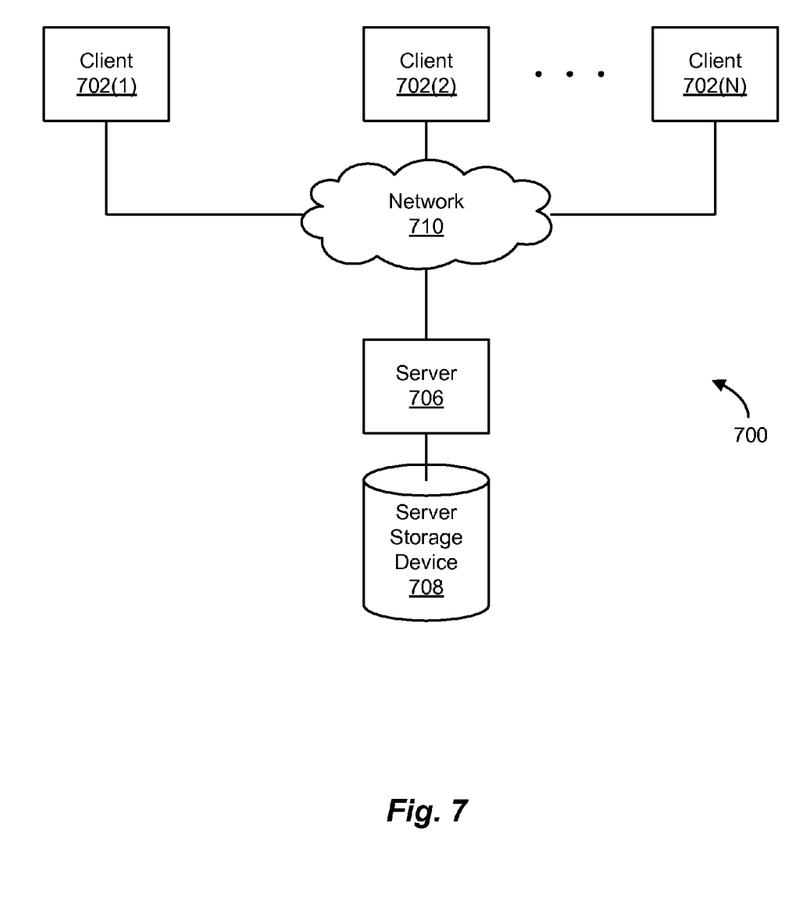
FIG. 7 is a block diagram illustrating a network architecture in which an embodiment of the present invention can be implemented.

FIG. 7 is a simplified block diagram illustrating a network architecture 700 in which one or more clients are provided with access to a server via various network connections. As depicted in FIG. 7, clients 702(1)-(N) are coupled to a network 710, and so are able to access a server 706 (which can be used to implement node(s) 202(1)-(2) or 402) via network 710. Other servers (not shown) can be used instead to implement tap device 210 or 410). A client can be implemented using, for example, a desktop computer, a laptop computer, a workstation, a server, a cell phone, a smart phone, a network-enabled personal digital assistant (PDA), or the like. An example of network 710, which can be used by clients 702(1)-(N) to access server 706, is the Internet. Alternatively, access to server 706 can be provided by a local area network (LAN) utilizing Ethernet, IEEE 802.11x, or some other communications protocol. As will be appreciated, server 706 can be accessed by clients coupled directly thereto (not shown).

As also depicted on FIG. 7, server 706 is coupled to a server storage device 708, which includes a data volume such as cluster shared volume. Server storage device 708 can be implemented as a single storage device or a collection of storage devices. Server storage device 708 can also be implemented as a storage area network, which couples remote storage devices to a server (e.g., server 706), such that the remote storage devices appear as locally-attached storage devices to the server's OS, for example.

In light of the present disclosure, those of skill in the art will appreciate that server storage device 708 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 700 can include other components such as routers, firewalls and the like that are not germane to the discussion of the present network and will not be discussed further herein. Those of skill in the art will also appreciate that other configurations are possible. For example, clients 702(1)-(N) can be directly coupled to server storage device 708 without the user of a server or Internet; server 706 can be used to implement both the clients and the server; network architecture 700 can be implemented without the use of clients 702(1)-(N); and so on.

As an example implementation of network architecture 700, server 706 (implemented with a node 202(1)) services requests to data generated by clients 702(1)-(N) to data stored in server storage device 708 (implemented with primary storage 204). Other servers (not depicted) can be implemented with tap device 210. Virtual machines (e.g., virtual machines 212(1)-212(6) of FIG. 2 and/or VM 402 of FIG. 4) implemented on coordinator node 202(1)-202(2) can be used to service these requests by reading and writing data to and from primary storage 204. A tap application (e.g., tap application 211 of FIG. 2) can be implemented using one of the other servers in the manner illustrated by FIGS. 2, 4, and/or 5.

Figure 8:
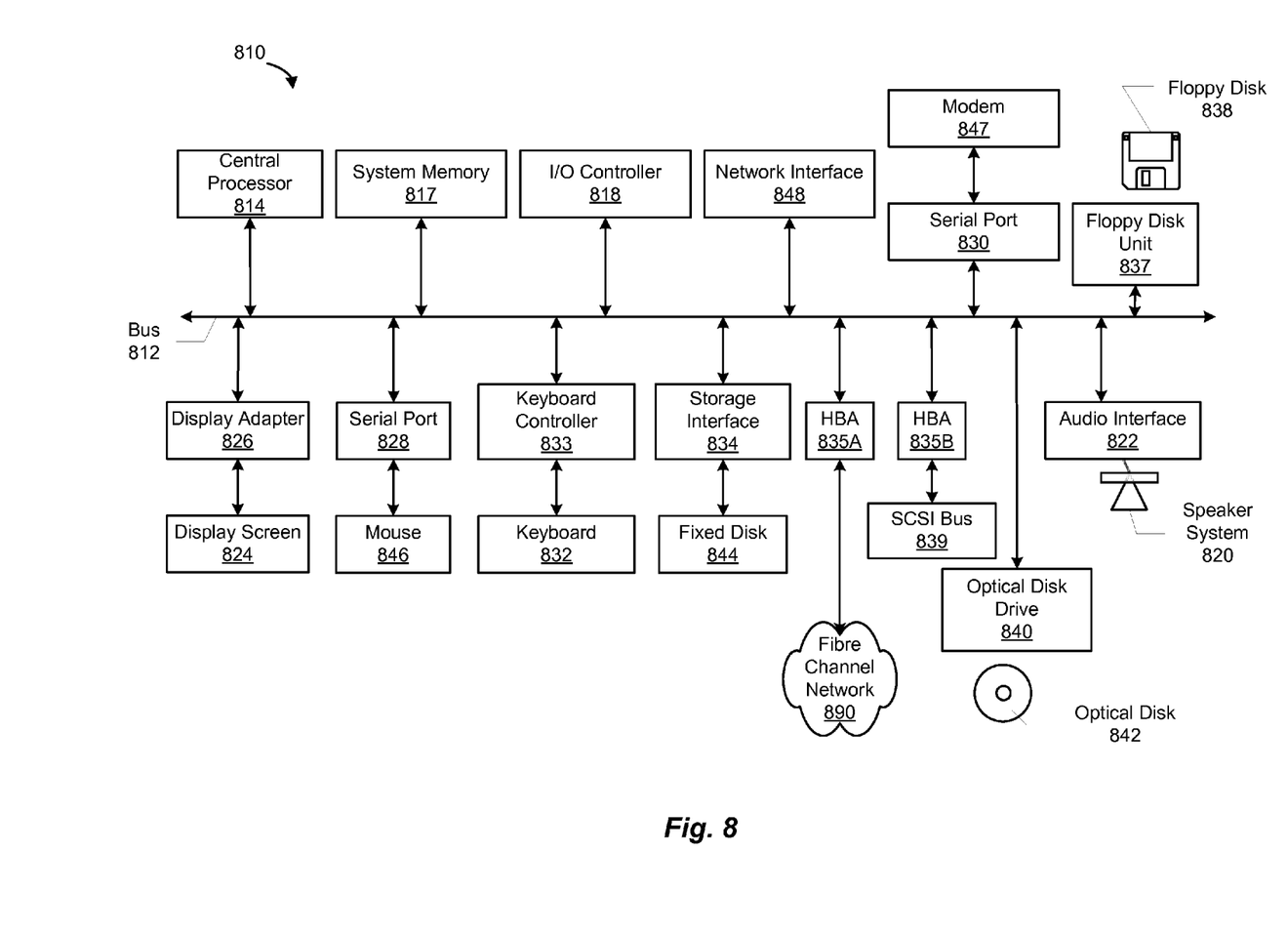
FIG. 8 is a block diagram that illustrates an example of a computer system suitable for implementing embodiments of the present invention.

FIG. 8 depicts a block diagram of a computer system 810 suitable for implementing the present disclosure. Computer system 810 may be illustrative of various computer systems in the networked systems 200, such as nodes 202(1) or 202(2) or tap device 210; system 300, such as node 302; system 400, such as node 402 or tap device 410, system 600, such as node 602 or tap device 610, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an interne service provider (ISP). Network interface 848 may provide a direct connection to a remote server via a direct network link to the Internet via a POP (point of presence). Network interface 348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code for the tap application and/or for providing an adaptive tap for a virtual machine protection (such as described above with reference to the method 500 of FIG. 5), etc., to implement the present disclosure can be stored in computer-readable storage media such as one or more of system memory 817, fixed disk 844, optical disk 842, or floppy disk 838. Memory 820 is also used for storing temporary variables or other intermediate information during the execution of instructions by the processor 810. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
    receiving an Input/Output (I/O) write from a first virtual machine of a plurality of virtual machines, wherein
        the plurality of virtual machines are executed on at least one server,
        each of the plurality of virtual machines is configured to generate one or more I/O writes to a VMFS file system on a primary storage,
        the I/O write comprises data and an offset at which the data is to be stored in the VMFS file system on the primary storage, and
        the at least one server and the primary storage are coupled to a network;
    determining a virtual machine (VM) indicator using the offset;
    generating a secondary write to a secondary storage based on the I/O write, wherein the secondary storage is coupled to the network, and
the secondary write comprises the data and the VM indicator associated with the I/O write; and
accessing the secondary storage to write the secondary write, wherein
the secondary storage is operable to store the data using the VM indicator.

2. The method of claim 1, further comprising:
prior to the generating, determining whether the VM indicator indicates that the first virtual machine is to be provided with one or more of a continuous data protection (CDP) or back-up, wherein
the generating and the accessing are performed if the first virtual machine is to be provided with one or more of CDP or back-up.

3. The method of claim 1, wherein the VM indicator comprises one or more of:
a first virtual machine disk (VMDK) associated with the first virtual machine, or
an indication of the first virtual machine.

4. The method of claim 3, wherein
the first virtual machine is configured to save a plurality of data using two or more VMDKs used by the VFMS file system on the primary storage, and
the two or more VMDKs comprise the first VMDK.

5. The method of claim 1, wherein
the I/O write, as received from the first virtual machine, does not comprise the VM indicator.

6. The method of claim 1, wherein the determining the VM indicator comprises:
querying a software entity on the at least one server using the offset to obtain the VM indicator.

7. The method of claim 1, wherein the determining the VM indicator comprises:
accessing a map file on the tap device to obtain the VM indicator for the offset, wherein
the map file comprises a plurality of mappings between offsets and corresponding VM indicators.

8. The method of claim 1, further comprising:
restoring the data for the first virtual machine from a plurality of data stored on the secondary storage.

9. The method of claim 1, further comprising:
monitoring the one or more I/O writes from the plurality of virtual machines; and
selectively generating secondary writes for the one or more I/O writes to the secondary storage based on the monitoring.

10. The method of claim 9, wherein:
the monitoring comprises analyzing one or more of the characteristics of the one or more I/O writes from each of the plurality of virtual machines,
the one or more characteristics comprise frequency or size of the one or more I/O writes from each of the plurality of virtual machines.

11. A system comprising:
a processing module configured to:
receive an Input/Output (I/O) write from a first virtual machine of a plurality of virtual machines, wherein
the plurality of virtual machines are executed on at least one server,
each of the plurality of virtual machines is configured to generate one or more I/O writes to a VMFS file system on a primary storage,
the I/O write comprises data and an offset at which the data is to be stored in the VMFS file system on the primary storage, and
the at least one server and the primary storage are coupled to a network;
a mapping module coupled to the processing module and configured to:
determine a virtual machine (VM) indicator using the offset; and
a write generator coupled to the processing module and configured to:
generate a secondary write to a secondary storage based on the I/O write, wherein
the secondary storage is coupled to the network, and
the secondary write comprises the data and the VM indicator associated with the I/O write; and
access the secondary storage to write the secondary write, wherein
the secondary storage is operable to store the data using the VM indicator.

12. The system of claim 11, wherein the VM indicator comprises one or more of:
a first virtual machine disk (VMDK) associated with the first virtual machine, or
an indication of the first virtual machine.

13. The system of claim 12, wherein
the first virtual machine is configured to save a plurality of data using two or more VMDKs used by the VFMS file system on the primary storage, and
the two or more VMDKs comprise the first VMDK.

14. The system of claim 11, wherein the mapping module is configured to determine the VM indicator by performing at least one of:
querying a software entity on the at least one server using the offset to obtain the VM indicator; or
accessing a map file on the tap device to obtain the VM indicator for the offset, wherein
the map file comprises a plurality of mappings between offsets and corresponding VM indicators.

15. The system of claim 11, wherein the processing module is further configured to:
monitor the one or more I/O writes from the plurality of virtual machines; and
selectively generate secondary writes for the one or more I/O writes to the secondary storage based on the monitoring.

16. A computer readable storage medium comprising program instructions executable by one or more processors to:
receive an Input/Output (I/O) write from a first virtual machine of a plurality of virtual machines, wherein
the plurality of virtual machines are executed on at least one server,
each of the virtual machines is configured to generate one or more I/O writes to a VMFS file system on a primary storage,
the I/O write comprises data and an offset at which the data is to be stored in the VMFS file system on the primary storage, and
the at least one server and the primary storage are coupled to a network;
determine a virtual machine (VM) indicator using the offset;
generate a secondary write to a secondary storage based on the I/O write, wherein
the secondary storage is coupled to the network, and
the secondary write comprises the data and the VM indicator associated with the I/O write; and
access the secondary storage to write the secondary write, wherein the secondary storage is operable to store the data using the VM indicator.

17. The computer readable storage medium of claim 16, wherein the VM indicator comprises one or more of:
   a first virtual machine disk (VMDK) associated with the first virtual machine, or
   an indication of the first virtual machine.

18. The computer readable storage medium of claim 16, wherein
   the first virtual machine is configured to save a plurality of data using two or more VMDKs used by the VFMS file system on the primary storage, and
   the two or more VMDKs comprise the first VMDK.

19. The computer readable storage medium of claim 16, wherein the program instructions are executable to determine the VM indicator by performing at least one of:
   querying a software entity on the at least one server using the offset to obtain the VM indicator; or
   accessing a map file on the tap device to obtain the VM indicator for the offset, wherein the map file comprises a plurality of mappings between offsets and corresponding VM indicators.

20. The computer readable storage medium of claim 16, wherein the program instructions are further executable to:
   monitor the one or more I/O writes from the plurality of virtual machines; and
   selectively generate secondary writes for the one or more I/O writes to the secondary storage based on the monitoring.

* * * * *